(12) United States Patent
Kobayashi et al.

(10) Patent No.: US 12,407,819 B2
(45) Date of Patent: Sep. 2, 2025

(54) VIDEO CODING METHOD, VIDEO CODING DEVICE, AND VIDEO CODING PROGRAM

(71) Applicant: NIPPON TELEGRAPH AND TELEPHONE CORPORATION, Tokyo (JP)

(72) Inventors: Daisuke Kobayashi, Tokyo (JP); Ken Nakamura, Tokyo (JP); Koyo Nitta, Tokyo (JP); Yuya Omori, Tokyo (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 117 days.

(21) Appl. No.: 18/277,066

(22) PCT Filed: Feb. 16, 2021

(86) PCT No.: PCT/JP2021/005727
§ 371 (c)(1),
(2) Date: Aug. 12, 2023

(87) PCT Pub. No.: WO2022/176019
PCT Pub. Date: Aug. 25, 2022

(65) Prior Publication Data
US 2024/0114130 A1 Apr. 4, 2024

(51) Int. Cl.
*H04N 19/11* (2014.01)
*H04N 19/119* (2014.01)
(Continued)

(52) U.S. Cl.
CPC ........... *H04N 19/11* (2014.11); *H04N 19/119* (2014.11); *H04N 19/176* (2014.11); *H04N 19/593* (2014.11)

(58) Field of Classification Search
CPC .... H04N 19/11; H04N 19/119; H04N 19/176; H04N 19/593; H04N 19/157; H04N 19/159
(Continued)

(56) References Cited

U.S. PATENT DOCUMENTS

2015/0156486 A1* 6/2015 Miyoshi ................ H04N 19/66
375/240.02
2015/0256851 A1 9/2015 Abe et al.
(Continued)

FOREIGN PATENT DOCUMENTS

JP 2015181225 A 10/2015
WO 2018047952 A1 3/2018

OTHER PUBLICATIONS

Chen et al. (2019) "Algorithm description for Versatile Video Coding and Test Model 5 (VTM 5)" Joint Video Experts Team (JVET) of ITU-T SG 16 WP 3 and ISO/IEC JTC 1/SC 29/WG 11 14th Meeting: Geneva, CH, Mar. 19-27, 2019, VTM algorithm description (JVET-N1002-v1).

*Primary Examiner* — Nathnael Aynalem

(57) ABSTRACT

A video coding method is a video coding method for coding an image in units of blocks obtained by dividing an image, and in the method a computer performs processing for dividing the image into blocks, acquiring an intra-image prediction mode predicted for each block, and generating, by using a combination pattern based on the intra-image prediction mode of a plurality of blocks adjacent to at least any one block, determining whether or not the plurality of blocks are to be combined, and performing prediction for each combined block when it is determined that the plurality of blocks are to be combined.

7 Claims, 17 Drawing Sheets

(51) Int. Cl.
*H04N 19/176* (2014.01)
*H04N 19/593* (2014.01)

(58) Field of Classification Search
USPC .......................................... 375/240–240.29
See application file for complete search history.

(56) References Cited

U.S. PATENT DOCUMENTS

| | | | |
|---|---|---|---|
| 2016/0156911 A1* | 6/2016 | Mitasaki | H04N 19/14 375/240.16 |
| 2016/0373744 A1* | 12/2016 | Lu | H04N 19/96 |
| 2019/0364271 A1 | 11/2019 | Shibata | |
| 2020/0221099 A1* | 7/2020 | Pham Van | H04N 19/176 |

* cited by examiner

VIDEO CODING METHOD, VIDEO CODING DEVICE, AND VIDEO CODING PROGRAM

CROSS-REFERENCE TO RELATED APPLICATIONS

This application is a U.S. 371 Application of International Patent Application No. PCT/JP2021/005727, filed on 16 Feb. 2021, the disclosure of which is hereby incorporated herein by reference in its entirety.

TECHNICAL FIELD

The technology of the disclosure relates to a video coding method, a video coding device, and a video coding program.

BACKGROUND ART

Conventionally, in the transmission and distribution of digital video, video coding defined in international video coding standards such as MPEG-2, H.264/AVC (Advanced Video Coding) and H.265/HEVC (High Efficiency Video Coding) is used, so that an amount of video data during distribution is reduced, and high-definition video distribution in a variety of network environments.

In recent years, VVC (video coding) has been defined as the following international standard for video coding of H.265/HEVC for the purpose of further high compression of video, with expanding the use of broadcast and distribution service of ultrahigh resolution video, such as 4K video having a resolution of 3840×2160 pixels and 8K video having a resolution of 7680×4320 pixels of a resolution four times the resolution 4K video.

In the coding standards such as H.265/HEVC and VVC, each frame is first divided into coding basic units called CTU (Coding Tree Unit). This corresponds to MB (Macro Block) in MPEG-2 or H.264/AVC.

Each CTU is further divided into units called CU (Coding Unit). In H.265/HEVC, each CTU is divided on the basis of a recursive quad tree block division (Quad Tree: hereinafter referred to as "QT division") having a tree structure in which each node is branched into four branches. Therefore, there are candidates of 8×8, 16×16, 32×32, and 64×64 as the sizes of the Cu which can be taken, and the CTU is constituted by the combination of the Cu of each size. Then, for each CU, a PU (Prediction Unit) as a prediction processing unit and a TU (Transform Unit) as a conversion processing unit are further set, each coding process is performed.

On the other hand, in the VVC, each CTU not only quad tree block division but also binary tree block division (hereinafter, referred to as "BT division") which bisects a block into two equal parts in a horizontal direction or a vertical direction, ternary tree division (Ternary tree division, hereinafter referred to as "TT division") which divides a block into three blocks in a horizontal direction or vertical direction with a 1:2:1 edge ratio is added. The CU in the VVC is divided into the CU of variable size, by repeating BT division or TU division in a horizontal direction or a vertical direction for each CU generated after recursively repeating QT division for the CTU. Therefore, as the size of the CU in the VVC, many sizes such as 32×4 or 8×16, including rectangles and squares of various sizes, obtained by dividing the original CTU by combining QT division, TT division, and BT division can be selected, and a CTU is constituted by a combination of these quadrangles and sizes of CU. Therefore, in the VVC, a complicated block division shape matching the pattern and feature of the coding target frame can be taken more than in the HEVC or the like, and highly efficient coding can be performed. In the VVC, coding such as prediction processing, frequency conversion, and quantization is performed in units of CU (for example, NPL 1).

CITATION LIST

Non Patent Literature

[NPL 1] Jianle Chen, Yan Ye, Seung Hwan Kim, "Algorithm description for Versatile Video Coding and Test Model 5 (VTM 5)", Joint Video Experts Team (JVET) of ITU-T SG 16 WP 3 and ISO/IEC JTC 1/SC 29/WG 11 14th Meeting: Geneva, CH, 19-27 Mar. 2019, VTM algorithm description (JVET-N1002-v1)

SUMMARY OF INVENTION

Technical Problem

However, since the block division pattern in the VVC is very huge compared to the HEVC, the encoder encodes or simply evaluates all the division patterns, compares the encoded result or the simply evaluated result, in order to determine the size of the CU, a huge amount of processing is required.

When determining the size of the CU, a method for narrowing down a division pattern by adaptively performing pruning of a division shape by using the division result of an adjacent block can be considered, however, since the reduction degree of processing by pruning changes according to the situation of each block determined according to the video, the processing amount is not constant. Also, even if pruning is performed, QT division, BT division, and TT division are respectively performed in the size of each CU, when the size is determined, the amount of processing is greatly increased by performing intra-screen prediction processing, conversion, quantization processing or the like in accordance with each division pattern and performing evaluation based on RD (Rate-Distortion) cost.

The present invention has been made in view of such circumstances, and an object of the present invention is to reduce the amount of processing for determining block division in coding while maintaining an intra-screen prediction mode corresponding to features of an original image.

Solution to Problem

A first aspect of the present disclosure is a video coding method in which a computer performs a processing for coding an image in block units obtained by dividing an image comprising:
  dividing the image into blocks;
  acquiring an intra-image prediction mode predicted for each block;
  by using a combination pattern based on the intra-image prediction mode of a plurality of blocks adjacent to at least any block, determining whether or not to combine the plurality of blocks;
  and performing prediction for each combined block when it is determined that the plurality of blocks is to be combined.

A second aspect of the present disclosure relates to a video coding device that encodes an image in block units obtained by dividing an image, comprising:
  a division unit that divides the image into blocks;

an acquisition unit that acquires an intra-image prediction mode predicted for each block; and a combining unit that determines whether to combine the plurality of blocks, and performs prediction for each combined block when it is determined that to combine the plurality of blocks.

A third aspect of the present disclosure is a video coding program for having a computer perform a processing for coding an image in block units obtained by dividing an image, comprising:

dividing the image into blocks;

acquiring an intra-image prediction mode predicted for each block;

determining whether or not to combine the plurality of blocks;

and performing prediction for each combined block when it is determined that the plurality of blocks is to be combined.

Advantageous Effects of Invention

According to the disclosed technique, the processing amount of block division determination in coding can be reduced while maintaining an intra-screen prediction mode corresponding to features of an original image.

DESCRIPTION OF EMBODIMENTS

Hereinafter, an example of a form for carrying out the present invention will be described in detail with reference to the drawings.

First Embodiment

Figure 1:
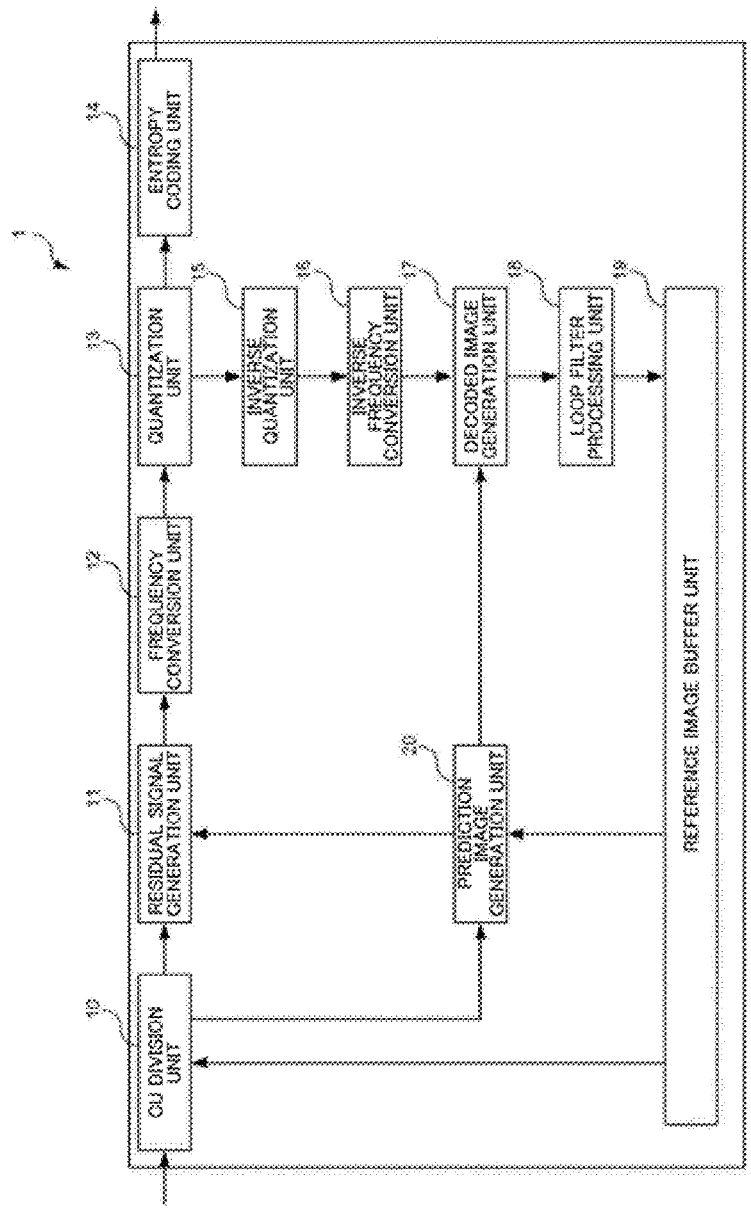
FIG. 1 is a block diagram showing an example of a functional configuration of a video coding device for explaining of processing for coding a video according to each embodiment.

First, referring to FIGS. 1 to 3, a processing of coding a video image by the video coding device 1 will be described. FIG. 1 is a block diagram showing an example of a functional configuration of a video coding device 1.

As shown in FIG. 1, a video coding device 1 includes a CU division unit 10, a residual signal generation unit 11, a frequency conversion unit 12, a quantization unit 13, an entropy coding unit 14, an inverse quantization unit 15, an inverse frequency conversion unit 16, a decoded image generation unit 17, a loop filter processing unit 18, a reference image buffer unit 19, and a prediction image generation unit 20.

The CU division unit 10 divides the CTU of the original image to be encoded into the CU, and determines the size of the CU and the prediction mode of each CU. Here, as shown in FIG. 2, the original image is divided into CTUs each having a range of 128 pixels in the horizontal direction and the vertical direction as one block. The CTU is further divided into CU which is a block divided recursively, and processing for coding the CU as one unit is performed. In the following description, the sizes of the CTU and the CU are assumed to be "(the number of pixels in the horizontal direction)×(The number of pixels in the vertical direction)". For example, a CTU having a range of 128 pixels in the horizontal direction and the vertical direction as one block is represented by 128×128.

Figure 2:
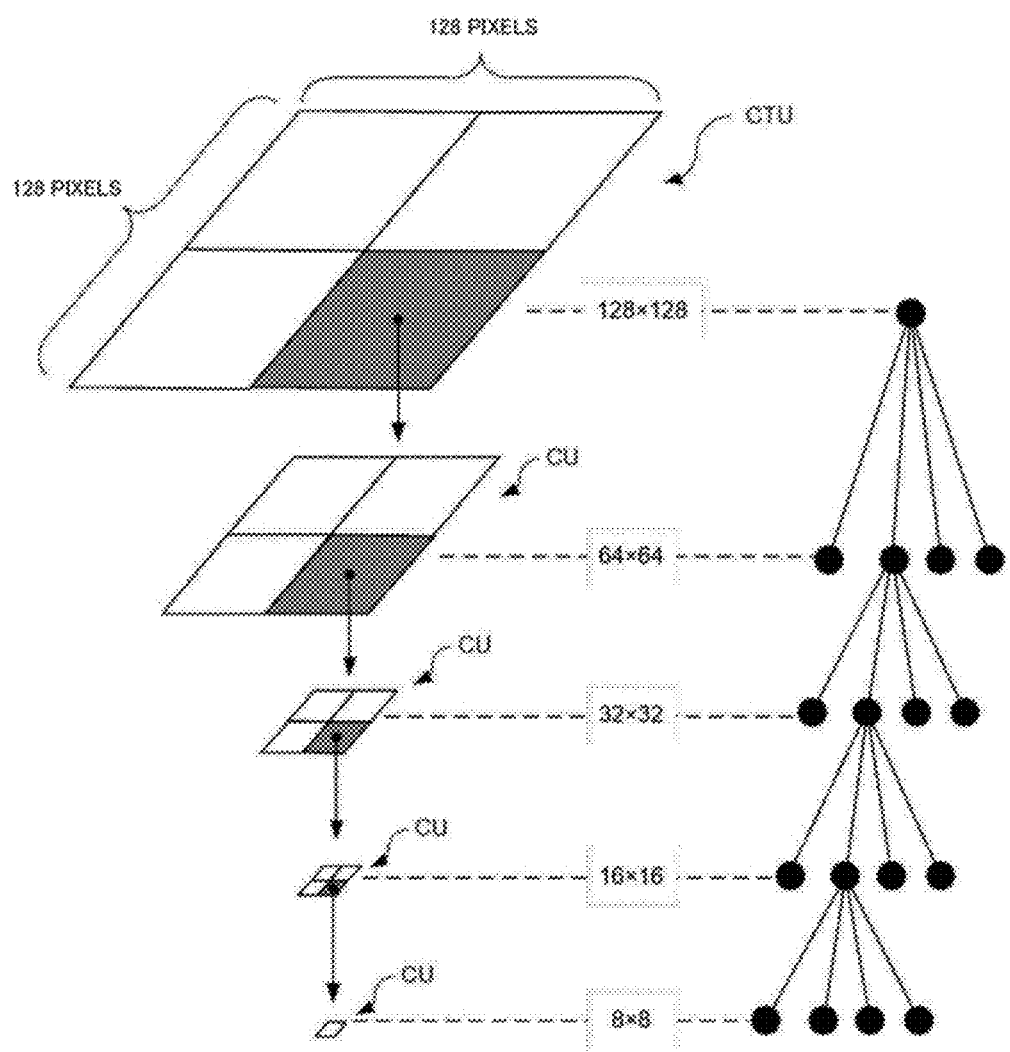
FIG. 2 is a schematic diagram showing an example of CTU for explaining of division according to each embodiment.
Figure 3:
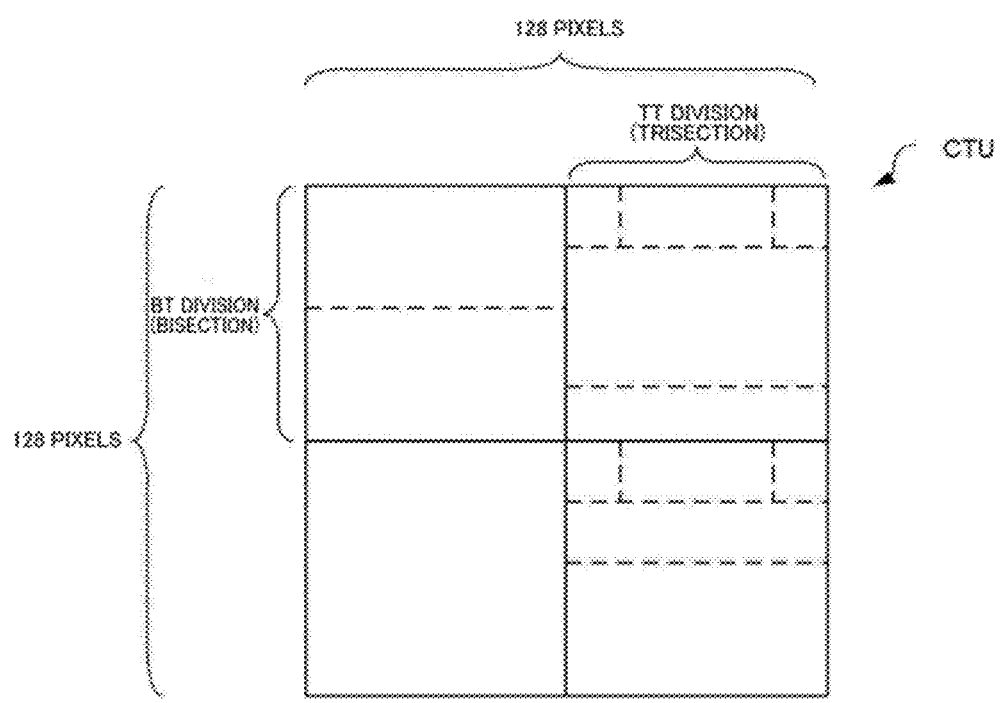
FIG. 3 is a schematic diagram showing an example of CTU for explaining of divided CU according to each embodiment.

As an example, as shown in FIG. 2, the CTU is divided into CU having 64×64, 32×32, 16×16, and 8×8, which are obtained by recursively dividing the CTU into four as one block, and further, it may be divided into two or three in a horizontal direction or a vertical direction. Thus, as shown in FIG. 3 as an example, CTU and CU are divided into two, three, and four, and are divided into CU of each size.

Figure 4:
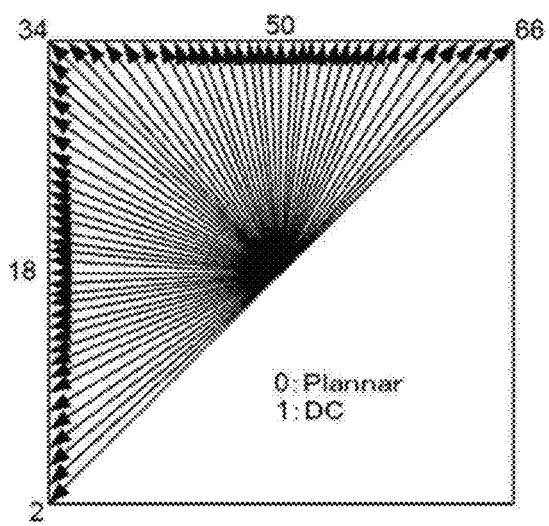
FIG. 4 is a diagram showing an example of intra-image prediction mode according to each embodiment.

The CU dividing unit 10 shown in FIG. 1 acquires an original image to be encoded and a decoded image from the reference image buffer unit 19 to be described later, and divides each CTU of the original image into the above-described CU. The CU division unit 10 outputs the original image divided into the size of each CU to the residual signal generation unit 11, and outputs the size of the CU and the prediction mode of the CU to the prediction image generation unit 20. The method of dividing the CU and the method of deriving the prediction mode according to the present invention will be described in detail with reference to FIGS. 4 to 17 which will be described later. A form that prediction mode of the present embodiment is an intra-image prediction mode will be described. The intra-image prediction mode is a value for determining a block to be referred to for coding from a block in an image whose coding is finished before a block to be encoded, and a direction in which the block to be referred to is positioned is predetermined by the value of the intra-image prediction mode. As an example, as shown in FIG. 4, the intra-image prediction mode of VVC has a mode that performs prediction by referring to the adjacent pixels of the CU from 65 different directions between 45 degrees obliquely below left diagonal (mode number 2) and 45 degrees obliquely above right diagonal (mode number 66). The intra-image prediction mode includes a Plannar mode (mode number 0) for performing prediction using four points of adjacent pixels and a DC mode (mode number 1) for performing an average of the adjacent pixels, there are 67 prediction modes in total. In the present embodiment, the intra-image prediction mode is derived by the past size determination processing and is associated with each CU related to the reference image, and the intra-image prediction mode corresponding to each CU is acquired from the reference image.

The residual signal generation unit 11 acquires an original image divided into respective CU from the CU division unit 10, and acquires a prediction image corresponding to the original image divided into respective CU from the prediction image generation unit 20. The residual signal generation unit 11 outputs a difference between the CU in the acquired original image and the CU in the prediction image corresponding to the CU in the original image to a frequency conversion unit 12 as a prediction residual signal.

The frequency conversion unit 12 acquires a prediction residual signal from the residual signal generation unit 11, and executes frequency conversion by discrete cosine transformation or discrete sine transformation for each of a horizontal direction of the prediction image and a vertical direction of the prediction image. The frequency conversion unit 12 outputs the derived conversion coefficient group to the quantization unit 13 as a result of frequency conversion.

The quantization unit 13 acquires a conversion coefficient group from the frequency conversion unit 12, and quantizes the conversion coefficient using a predetermined quantization parameter. The quantization unit 13 outputs the quantized conversion coefficient to the entropy coding unit 14 and the inverse quantization unit 15.

The entropy coding unit 14 acquires the quantized conversion coefficient from the quantization unit 13, entropy-encodes the quantized conversion coefficient, and derives a bit stream. The entropy coding unit 14 outputs a bit stream that is derived as the result of entropy-encoding to a not shown external device.

The inverse quantization unit 15 acquires the quantized conversion coefficient from the quantization unit 13, and executes inverse quantization processing on the quantized conversion coefficient to generate a conversion coefficient. The inverse quantization unit 15 outputs conversion coefficient as a result of inverse quantization processing to the inverse frequency conversion unit 16.

The inverse frequency conversion unit 16 acquires a conversion coefficient from the inverse quantization unit 15, executes inverse frequency conversion on the conversion coefficient, and generates a prediction residual signal. The inverse frequency conversion unit 16 outputs the prediction residual signal to the decoded image generation unit 17.

The decoded image generation unit 17 acquires the prediction residual signal from the inverse frequency conversion unit 16, and acquires the prediction image of the original image from the prediction image generation unit 20 described later. The decoded image generation unit 17 generates a decoded image of the original image for each CU by adding the prediction residual signal to the prediction image for each CU. The decoded image generation unit 17 outputs the decoded image of the original image to the loop filter processing unit 18 and the reference image buffer unit 19.

The loop filter processing unit 18 acquires a decoded image from the decoded image generation unit 17, and executes filter processing for reducing distortion of coding on the decoded image. The loop filter processing unit 18 outputs the decoded image subjected to the filter processing to the reference image buffer unit 19.

The reference image buffer unit 19 acquires a decoded image before filter processing from the decoded image generation unit 17, and acquires a decoded image after filter processing from the loop filter processing unit 18. The reference image buffer unit 19 stores the acquired decoded image before filter processing and the decoded image after filter processing as images for reference. That is, the reference image buffer unit 19 stores a decoded image obtained by decoding the past original image as a reference image.

The prediction image generation unit 20 acquires a prediction mode of CU related to the original image from the CU division unit 10, and acquires a past decoded image stored as an image for reference from the reference image buffer unit 19. The prediction image generation unit 20 generates a prediction image of the original image on the basis of the prediction mode of the original image and past decoded image data. The prediction image generation unit 20 outputs the prediction image to the residual signal generation unit 11.

Figure 5:
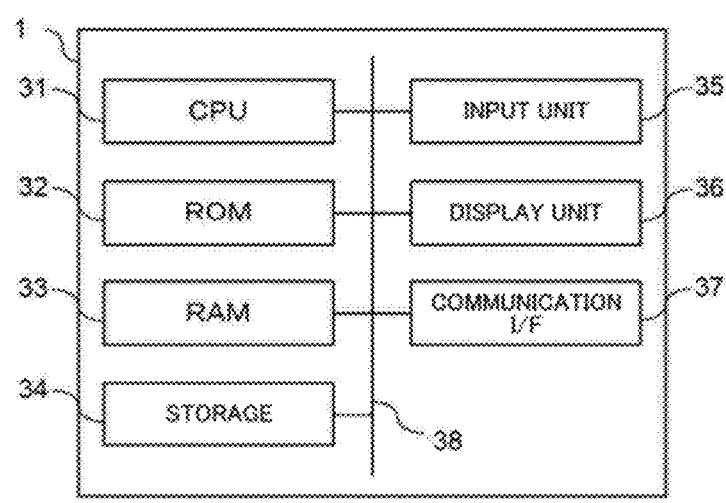
FIG. 5 is a diagram showing an example of a hardware configuration of a video coding device according to each embodiment.

Next, a hardware configuration of the video coding device 1 according to the present embodiment will be described with reference to FIG. 5. FIG. 5 is a block diagram showing a hardware configuration of the video coding device 1.

As shown in FIG. 5, the video coding device 1 includes a CPU (Central Processing Unit) 31, a ROM (Read Only Memory) 32, a RAM (Random Access Memory) 33, storage 34, an input unit 35, a display unit 36, and a communication interface (I/F) 37. The respective configurations are connected to each other communicably by a bus 38.

The CPU 31 is a central calculation processing unit that executes various programs and controls the respective units. More specifically, the CPU 31 reads a program from the ROM 32 or the storage 34 and executes the program using the RAM 33 as a working area. The CPU 31 controls the respective configurations described above and performs various types of calculation processing in accordance with the program stored in the ROM 32 or the storage 34. In the present embodiment, a ROM 32 or a storage 34 stores a determination processing program for determining the size of the CU related to the original image and a combining processing program for combining sub-blocks related to the original image.

The ROM 32 stores various programs and various types of data. The RAM 33 is a work area and temporarily stores a program or data. The storage 34 is configured of a storage device such as HDD (Hard Disk Drive) or SSD (Solid State Drive), and stores various programs including an operating system and various types of data.

The input unit 35 includes a pointing device such as a mouse and a keyboard, and is used to input various types of input.

The display unit 36 is a liquid crystal display, for example, and displays various information. The display unit 36 may also function as an input unit 35 by employing a touch panel scheme.

The communication interface 37 is an interface for communicating to other equipment such as display equipment. In the communication interface, for example, a wired communication standard such as Ethernet™ or FDDI, or a wireless communication standard such as 4G, 5G, or Wi-Fi™ is used.

Figure 6:
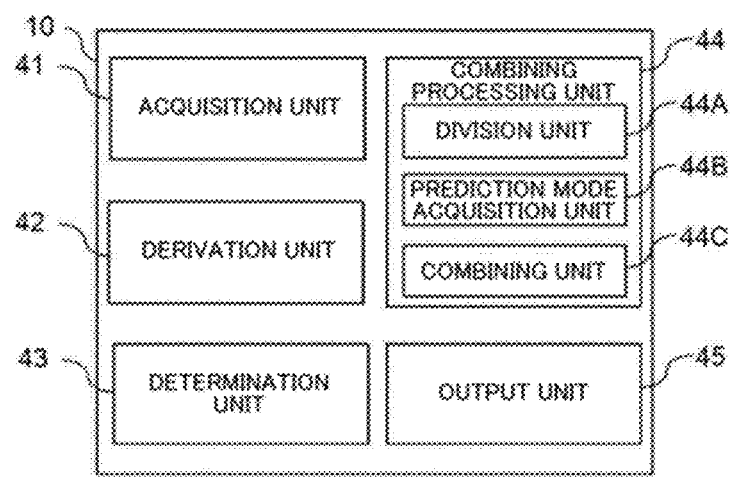
FIG. 6 is a block diagram showing a functional configuration of a CU division unit of the video coding device according to the first embodiment.
Figure 7:
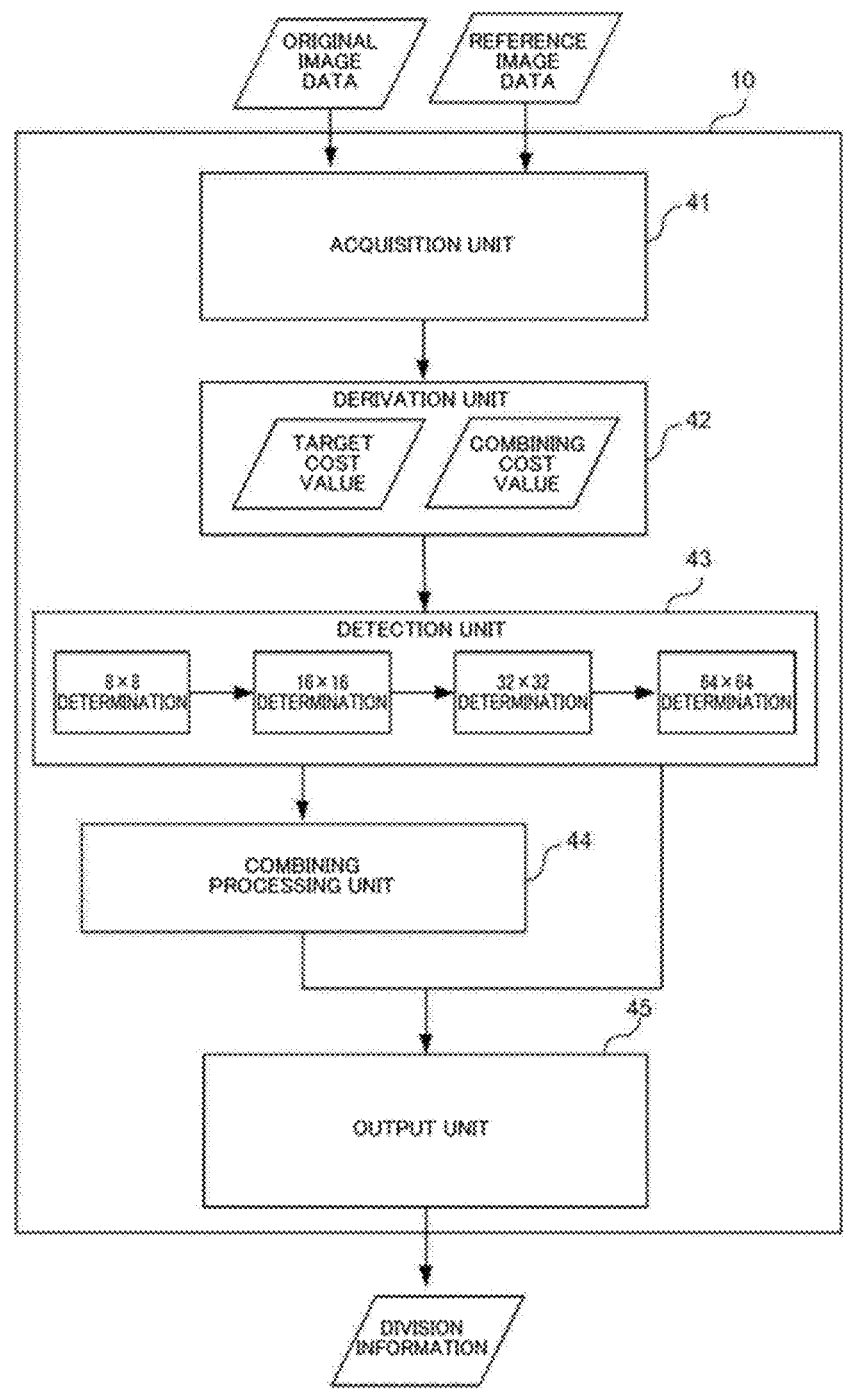
FIG. 7 is a data flow diagram showing an example of data flow of determination processing according to the first embodiment.

Next, a functional configuration of the CU division unit 10 of the video coding device 1 will be described with reference to FIG. 6 and FIG. 7. FIG. 6 is a block diagram showing an example of a functional configuration of the CU division unit 10 of the video coding device 1. FIG. 7 is a data flow chart showing an example of flow of data in the determination processing of the function of the CU dividing unit 10.

As shown in FIG. 6, the CU division unit 10 of a video coding device 1 includes, as a functional configuration, an acquisition unit 41, a derivation unit 42, a determination unit 43, a combining processing unit 44, and an output unit 45. The CPU 31 executes a determination processing program to function as the acquisition unit 41, the derivation unit 42, the determination unit 43, the combining processing unit 44, and an output unit 45. The combining processing unit 44 includes a division unit 44A, a prediction mode acquisition unit 44B, and a combining unit 44C.

As shown in FIG. 7, the acquisition unit 41 acquires an input original image and a decoded image obtained by decoding the original image in the past.

The derivation unit 42 derives RD costs of CU of a predetermined size from the acquired original image and the decoded image. Here, the CU of a predetermined size is 64×64, 32×32, 16×16, 8×8, and 4×4 CU. Further, the RD cost of the present embodiment is acquired from the original image and the decoded image, and is a value indicating a magnitude of information content and an error in coding.

Figure 8:
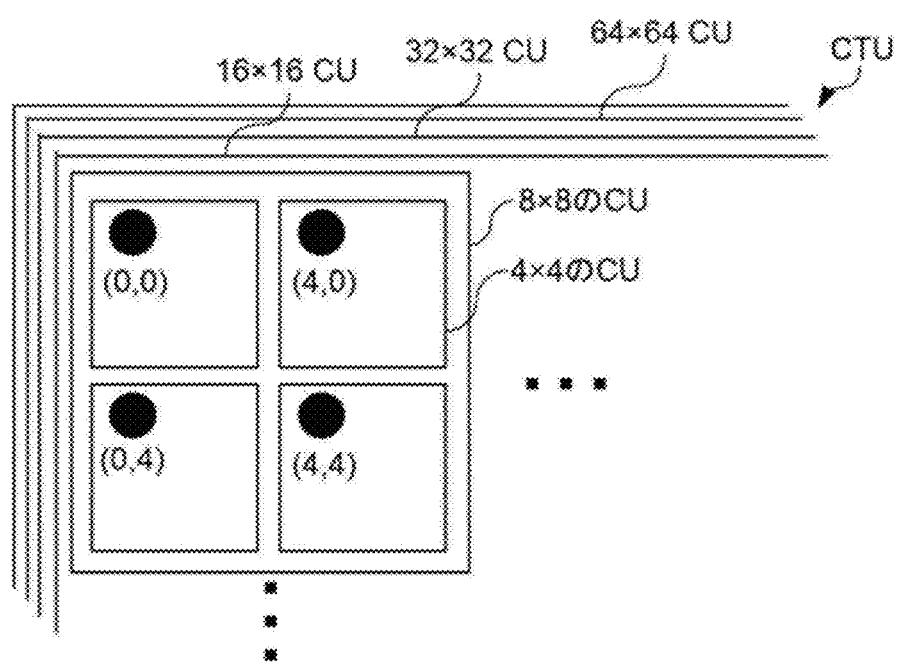
FIG. 8 is a diagram showing an example of a CU for explaining derivation of a combined cost value according to each embodiment.

As an example, as shown in FIG. 8, the derivation unit 42 derives the combined RD cost of each of the 4×4 CUs based on (0,0), (4,0), (0,4), (4,4) (hereinafter referred to as the "combined cost value"). The derivation unit 42 derives an RD cost of an 8×8 CU based on (0,0) including the four 4×4 CUs, as an RD cost of the CU to be determined (hereinafter referred to as "target cost value").

The derivation unit 42 further derives, in a range of size of 16×16 CU, combined cost values of 8×8 CUs based on (0,0), (8,0), (0,8), (8,8), and a target cost value of 16×16 CU based on (0,0) including the four 8×8 CUs. The derivation unit similarly derives a combined cost value and a target cost value in a range of size of 32×32 CU and a range of size of 64×64 CU, the above-mentioned processing is recursively executed until the target cost value of the CU of 64×64 is derived. When deriving the target cost value of the 64×64 CU, the derivation unit 42 recursively executes the same processing in the range of the next 64×64 CU (for example, an adjacent CU), and recursively executes the same processing until the processing is executed to all the CU included in the CTU.

The determination unit 43 shown in FIG. 7 compares a combined cost value obtained by adding RD costs of the four CUs derived by the derivation unit 42 with a target cost value in the CU including the four CUs, and determines whether or not the target cost value is equal to or less than the combined cost value. As an example, the determination unit 43 compares a combined cost value in four 4×4 CUs with a target cost value of 8×8 CU including four 4×4 CUs, and determines whether or not the target cost value is equal to or less than the combined cost value.

As an example, as shown in FIG. 7, as 8×8 determination, the determination unit 43 compares the combined cost value of four 4×4 CUs with the target cost value of 8×8 CU including four 4×4 CUs. Next, as 16×16 determination, the determination unit 43 compares the combined cost value of the four 8×8 CUs with the target cost value of the 16×16 CU including the four 8×8 CUs. Similarly, the determination unit 43 performs 32×32 determination and 64×64 determination. That is, the determination unit 43 recursively performs determinations by comparing the combined cost value with the target cost value, while expanding the size of the CU to be determined from a smaller CU to a larger CU. The determination unit 43 recursively performs determination until processing is executed to all the CUs included in the CTU.

A combining processing unit 44 combines blocks of the target CU when the target cost value exceeds the combined cost value, and derives the size of the combined CU, the RD cost of the CU, and a prediction mode of the CU.

Specifically, the division unit 44A of the combining processing unit 44 divides the target CU into 16 sub-blocks each obtained by dividing the target CU into four in a horizontal direction and a vertical direction. When the target CU is 8×8 CU, the division unit 44A divides the target CU into four sub-blocks each obtained by dividing into two in a horizontal direction and a vertical direction.

Figure 9:
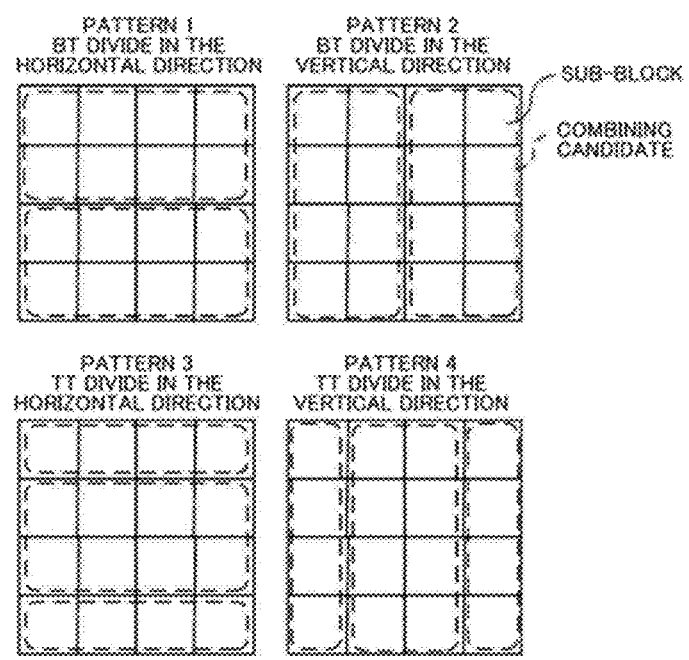
FIG. 9 is a diagram showing an example of a CU for explaining combining pattern according to each embodiment.

The prediction mode acquisition unit 44B of the combining processing unit 44 derives and acquires variation Vi of prediction modes of combination candidates in which sub-blocks are combined in respective patterns. Here, as shown in FIG. 9 as an example, the combining pattern is the respective pattern of combining sub-blocks so that the target CU is horizontally divided into BT, vertically divided into BT, horizontally divided into TT, and vertically divided into TT. That is, the prediction mode acquisition unit 44B derives the prediction mode variation Vi for each combination candidate when the target CU is horizontally BT-divided, vertically BT-divided, horizontally TT-divided, and vertically TT-divided. When the target CU is 8×8 CU, the prediction mode acquisition unit 44B acquires variation Vi for each combination candidate when BT division is performed in a horizontal direction, and BT division is performed in a vertical direction.

Here, V is the degree of variation in the prediction mode of the combination candidate, and i is a symbol for identifying a pattern obtained by dividing the CU (for example, a pattern obtained by BT division in the horizontal direction in the case of i=1). Further, a description will be given of a form in which the variation Vi of the prediction mode according to the present embodiment is a variance value of the prediction mode of the sub-block included in the combination candidate. However, it is not limited to this. The variation Vi of the prediction mode may be a difference absolute value sum obtained by summing absolute values of differences of the prediction modes between the sub-blocks included in the combination candidate, or a difference between a maximum value and a minimum value of the prediction mode in the sub-block.

The combining unit 44C in the combining processing unit 44 shown in FIG. 6 specifies the minimum variation Vi from the variations Vi of all the derived prediction modes, and determines a pattern for the specified variation Vi as a pattern to be combined when the specified variation Vi is equal to or less than a threshold. The combining unit 44C combines the sub-blocks with combination candidates according to the determined pattern as combined CU, and derives RD costs and prediction modes of the combined CU. When the specified variation Vi exceeds a threshold, a combining unit 44C does not combine the sub-blocks. That is, the CU on which the QT division is performed is combined to constitute a shape when BT division or TT division is performed, and on the basis of a prediction mode of the combined CU, it is determined whether or not a shape in BT division or TT division is to be a shape of CU. Here is an example of combining if the variance is equal to or less than a predetermined threshold value.

A description will be given of a form in which the threshold value of the present embodiment is a positive natural number equal to or greater than 0. For example, if the variation Vi of the prediction mode is a variance value, and if the intra-image prediction modes (mode numbers) of four sub-blocks are 11, 12, 13, and 14 indicating approximately the same direction, the variation Vi of the prediction mode is 1.6. On the other hand, when the intra-image prediction modes (mode numbers) of four sub-blocks are 10, 20, 30, and 40 indicating different directions, the variation Vi of the prediction modes is 166.6. That is, when the variation Vi of the prediction mode is a variance value, the variance value becomes small in an intra-image prediction mode indicating the approximately same direction, and intra-image prediction modes indicating different directions, the variance value becomes large. Therefore, a small value (for example, any one value of 1 to 9) may be set as the threshold value so as to combine sub-blocks of the intra-image prediction mode indicating approximately the same direction and not to combine sub-blocks of the intra-image prediction mode indicating different directions.

Further, a description will be given of a form in which the prediction mode of the combined CU according to the present embodiment is an average value of the prediction modes of the sub-blocks of the combined CU. However, it is not limited to this. The prediction mode may be the most frequent value of the prediction mode of the sub-block of the combined CU. For example, if the prediction mode is an average value of the prediction modes of the sub-blocks, if the prediction mode of each sub-block is 11, 12, 14, and 15 in the sub-blocks of the four pre-combined CUs, the prediction mode of the combined CU is the average value 13. When the prediction mode is the most frequent value of the prediction mode of the sub-block, and in the sub-blocks of the four pre-combined CUs, if the prediction mode of each sub-block is 10, 10, 12, and 14, the prediction mode of the combined CU is the mode value 10.

Figure 10:
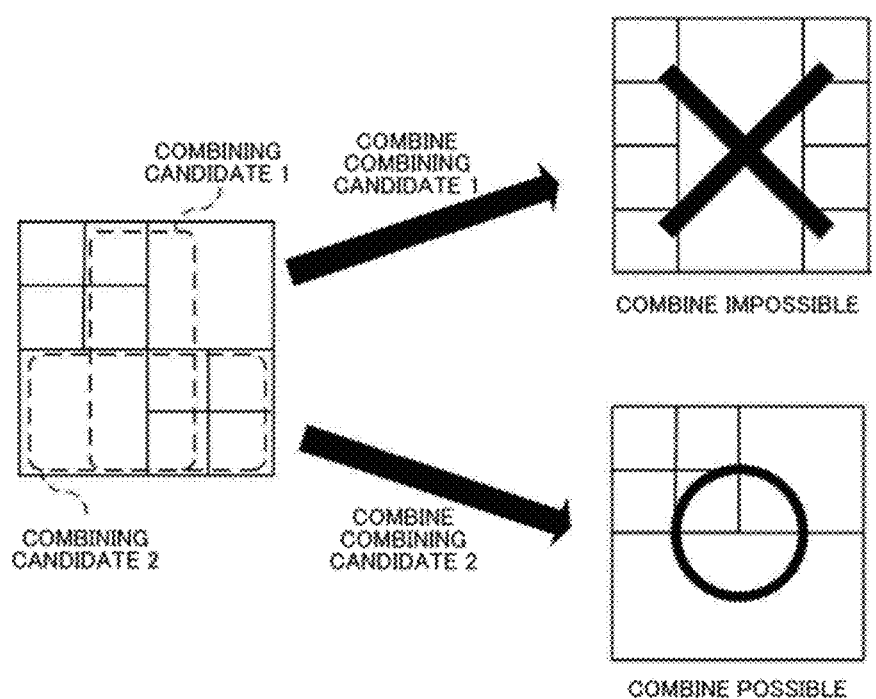
FIG. 10 is a diagram showing an example of a CU for explaining the case where no combining is performed according to each embodiment.

A description will be given of a form in which the RD cost of the combined CU of the present embodiment is a value obtained by adding or subtracting a predetermined value to or from the sum of the RD costs of the sub-blocks of the combined CU. By adding or subtracting a predetermined value to or from the sum of RD costs held by each sub-block before combining, the RD costs of the rectangular CU after combining are not actually encoded and derived, but can be easily derived by using already derived RD costs. Further, as shown in FIG. 10, if the combining in the region of the combination candidate involves dividing a CU in the region, the combining is not performed. In other words, when all the CUs of a combined CU are included in a combination candidate, the CUs in the region in the combination candidate are combined.

The output unit 45 shown in FIG. 7 outputs, as division information, an original image divided into the size of each CU, the size of each CU, the RD cost of each CU, and the prediction mode of each CU, to the residual signal generation unit 11 in FIG. 1. Here, when the determination unit 43 determines that the target cost value is equal to or less than the combined cost value, the output unit 45 outputs the size of the target CU, the RD cost of the target CU and the prediction mode of the target CU. When the determination unit 43 determines that the target cost value exceeds the combined cost value, the output unit 45 outputs the size of the combined CU, the RD cost derived by the combining processing unit 44, and the prediction mode derived by the combining processing unit 44.

Figure 11:
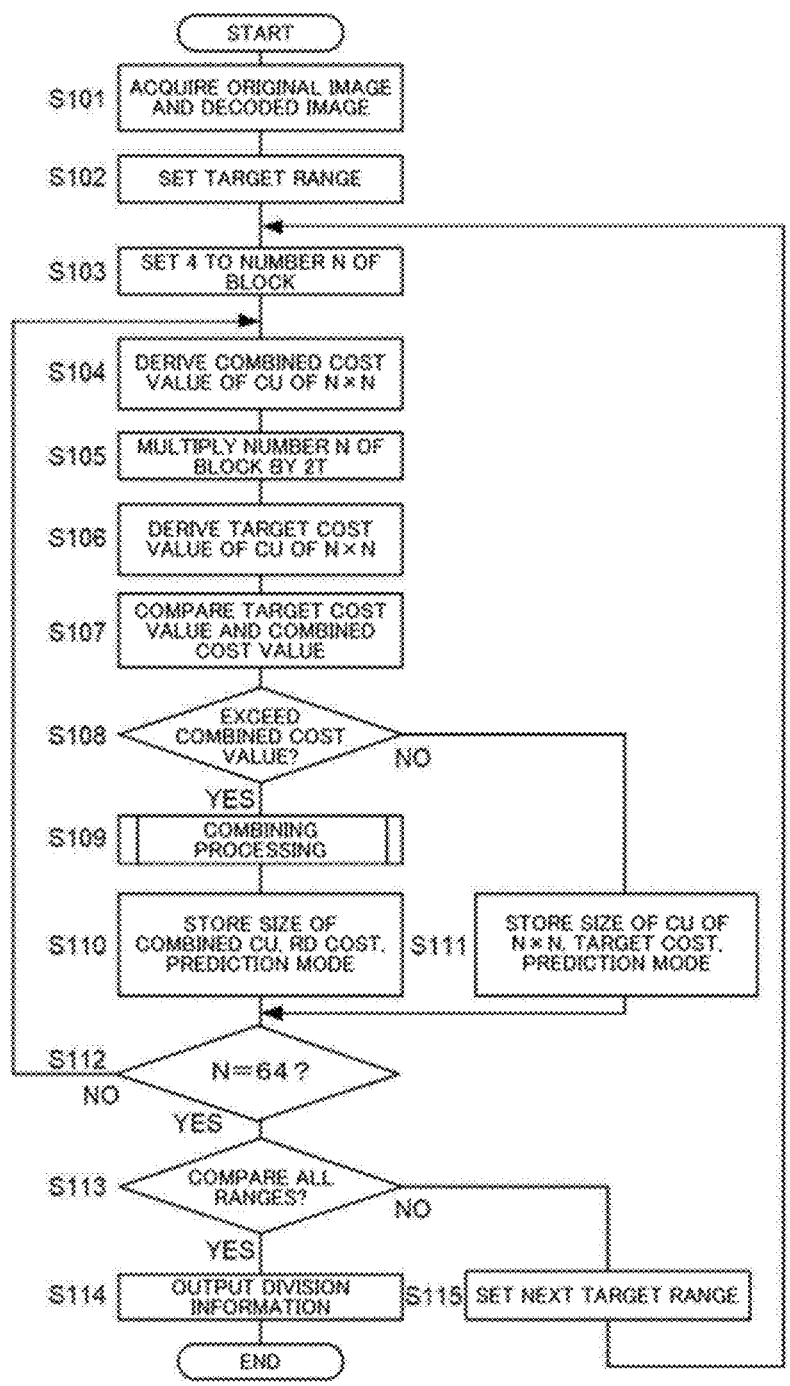
FIG. 11 is a flowchart showing an example of a flow of a determination processing of a block size of CU according to the first embodiment.
Figure 12:
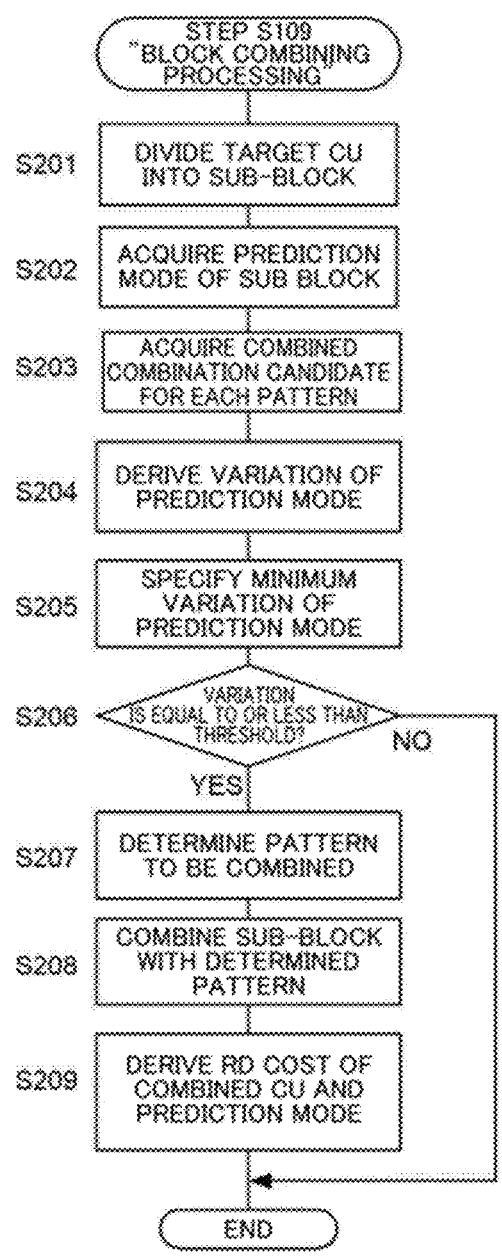
FIG. 12 is a flowchart showing an example of a flow of combining processing in which CUs are combined according to the first embodiment.

Next, the operation of the video coding device 1 according to the present embodiment will be described with reference to FIG. 11 and FIG. 12. FIG. 11 is a flowchart showing an example of the determination processing according to the present embodiment. The determination processing shown in FIG. 11 is performed by the CPU 31 reading and executing the determination processing program from the ROM 32 or the storage 34. The determination processing program shown in FIG. 11 is executed when, for example, an original image is input and an instruction to execute coding is input.

In a step S101, the CPU 31 acquires original image data and decoded image data.

In a step S102, the CPU 31 divides the original image by each CTU and sets the target CU, which is the target range for determination, by dividing the image by every 64×64 for the CTU.

In a step S103, the CPU 31 sets 4 to the number N of blocks.

In a step S104, the CPU 31 derives a combined cost value in the CU of N×N size. Note that the combined cost value of the CU having a size of N×N according to the present embodiment is a value obtained by adding RD costs of the four CUs to the sizes of the respective CU of 4×4, 8×8, 16×16 and 32×32.

In a step S105, the CPU 31 multiplies N by 2 to obtain the size of a target CU larger by one size.

In a step S106, the CPU 31 sets the CU of N×N size as a target CU, and derives a target cost value of the target CU. When the processing of the step S106 is performed for the first time through the step S103, the CPU 31 sets a CU of 8×8 size as a target CU. Thereafter, every time the step S104 and the step S105 are repeated, the CPU 31 increases the size of the target CU to 16×16, 32×32, and finally 64×64.

In a step S107, the CPU 31 compares the target cost value with the combined cost value as N×N determination. Here, for example, when the target cost value is an RD cost value in an 8×8 target CU, a combined cost value obtained by adding RD costs of four 4×4 CU included in the target CU is compared with a target cost value which is an RD cost in the 8×8 target CU.

In a step S108, the CPU 31 determines whether or not the target cost value exceeds the combined cost value. When the target cost value exceeds the combined cost value (step S108: Yes), the CPU 31 shifts to a step S109. On the other hand, when the target cost value does not exceed the combined cost value (the target cost value is equal to or less than the combined cost value) (step S108: No), the CPU 31 shifts to a step S111.

In the step S109, the CPU 31 performs combining processing for combining sub-blocks obtained by dividing the CU into a predetermined number. By performing combining processing, a plurality of CU divided by QT division is combined, and a rectangular CU shape obtained when BT division or TT division is performed is obtained. The combining processing according to the present embodiment will be described later in detail with reference to FIG. 12.

In a step S110, the CPU 31 stores the size of the combined CU, the RD cost, and the prediction mode in association with each other.

In the step S111, the CPU 31 stores the size of the N×N CU, the RD cost, and the prediction mode in association with each other.

In a step S112, the CPU 31 determines whether or not the number N of blocks is 64. When the number N of blocks is 64 (step S112: Yes), the CPU 31 shifts to a step S113. On the other hand, when the number N of blocks is not 64 (step S112: No), the CPU 31 shifts to the step S104.

In the step S113, the CPU 31 determines whether or not all ranges are compared in the set target range. When all the ranges are compared (step S113: Yes), the CPU 31 shifts to a step S114. On the other hand, when all the ranges are not compared (step S113: No), the CPU 31 shifts to a step S115.

In the step S114, the CPU 31 outputs the original image, the sizes of all CU in the original image, RD costs, and the prediction mode are output as division information.

In a step S115, the CPU 31 sets a target CU which is a target range of the next determination, and shifts to the step S103.

Next, the combining processing will be described with reference to FIG. 12. FIG. 12 is a flowchart showing an example of the combining processing according to the present embodiment. The combining processing shown in FIG. 12 is performed by CPU 31 reading and executing the combining processing program from the ROM 32 or the storage 34. The combining processing program shown in FIG. 12 is executed when an instruction to execute the combining processing is input.

In a step S201, the CPU 31 divides the target CU for each sub-block. The target CU is any CU of 8×8, 16×16, 32×32, and 64×64, and when the target CU is 16×16, 32×32, and 64×64 CU, the target CU is divided into 16 divisions, When the target CU is 8×8 CU, the CPU is divided into 4 divisions.

In a step S202, the CPU 31 acquires a prediction mode of a sub-block.

In a step S203, the CPU 31 acquires a combination candidate obtained by combining sub-blocks for each combining pattern for the target CU. When the target CU is 16×16, 32×32, and 64×64 CU, a combination candidate of the pattern 1 to the pattern 4 shown in FIG. 9 is acquired, and when the target CU is 8×8 CU, a combination candidate of the pattern 1 and the pattern 2 is acquired.

In a step S204, the CPU 31 derives variation Vi of the prediction mode for each combination candidate.

In a step S205, the CPU 31 specifies the minimum variation Vmin of the prediction mode among the derived variation Vi of the prediction mode.

In a step S206, the CPU 31 determines whether or not the variation Vmin of the specified minimum prediction mode is equal to or less than a threshold. When the variation Vi of the specified prediction mode is equal to or less than a threshold (step S206: Yes), the CPU 31 shifts to a step S207. On the other hand, when the specified variation Vi of the prediction mode is not equal to or less than the threshold (the variation Vi of the prediction mode exceeds the threshold) (step S206: No), the CPU 31 ends the combining processing.

In a step S207, the CPU 31 determines a pattern for the variation Vi of the specified prediction mode as a pattern for combining sub-blocks.

In a step S208, the CPU 31 combines the sub-block according to the determined pattern as the combined CU. Here, when the combining pattern of the combined CU is changed by combining, the CU is not combined.

In a step S209, the CPU 31 derives RD costs and prediction modes of the combined CU.

As described above, according to the present embodiment, it is possible to reduce the processing amount of the block division determination in an encoder while maintaining the intra-screen prediction mode corresponding to the features of the original image.

In the present embodiment, the block division and the sub-block combination are performed in accordance with the situation of the CU division. Here, in the CTU, in a region where a fine density change and an edge do not exist, an adjacent block is not finely divided, there is a tendency to be composed of large CUs. Therefore, in regions where there are no fine density changes and edges, there is a tendency to decrease the processing amount without performing division processing and combining processing. On the other hand, in the CTU, there is a tendency that adjacent blocks are finely divided (composed of small CUs) in a region where a fine density change and an edge exist. Therefore, there is a tendency to increase the division processing and the combining processing in the region where the fine density change and the edge exist.

Also, for example, in the case of a region having an edge such that a line extends in the vertical direction, CU including the region tends to be divided in the vertical direction, the CU adjacent to the CU in the vertical direction is also likely to be divided in the vertical direction. Therefore, in a region having an edge in which a line extends in the vertical direction, it is not necessary to perform evaluation such as dividing and combining CU in the horizontal direction, so that the amount of processing can be reduced.

Second Embodiment

In a first embodiment, a description will be given of a form in which the determination unit 43 determines whether or not the CU to be determined is smaller than the CU to be larger than the CU to be determined, and the determination is performed by comparing the target cost with the target cost. In the present embodiment, a description will be given of a form in which the determination unit 43 performs determinations comparing recursively a combined cost value with a target cost, while reducing the size of the CU to be determined from a large CU to a small CU.

Since a diagram (see FIG. 1) showing an example of a functional configuration of the video coding device 1 according to the present embodiment, a diagram (see FIG. 2) showing an example of a CTU to be used for explanation of division, and a diagram (see FIG. 3) showing an example of a CTU to be used for explanation of a divided CU are the same as in the first embodiment, description thereof will be omitted. Further, a diagram showing the hardware configuration of the video coding device 1 according to the present embodiment (see FIG. 5), a diagram (see FIG. 8) showing an example of a CU including four CU, and a diagram (see FIG. 9) showing an example of a CU for explaining a combining pattern are the same as those of the first embodiment, and therefore, description thereof is omitted. Further, since a diagram (FIG. 10) showing an example of the CU without combining according to the present embodiment is the same as that of the first embodiment, description thereof is omitted.

Figure 13:
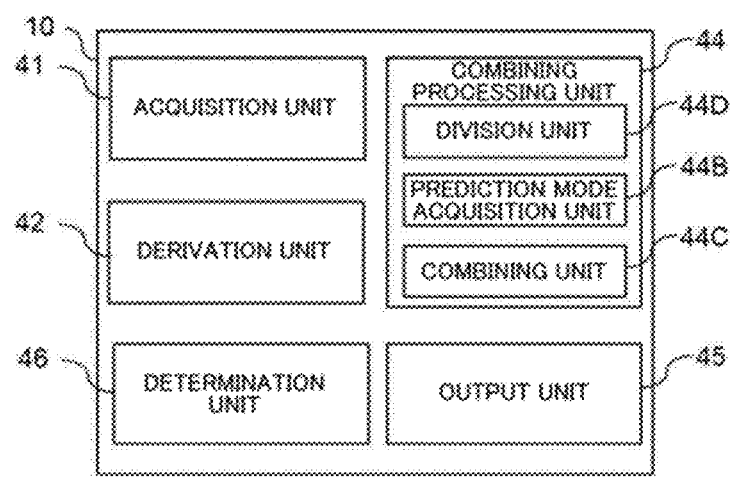
FIG. 13 is a block diagram showing an example of a functional configuration of the CU division unit of the video coding device according to a second embodiment.
Figure 14:
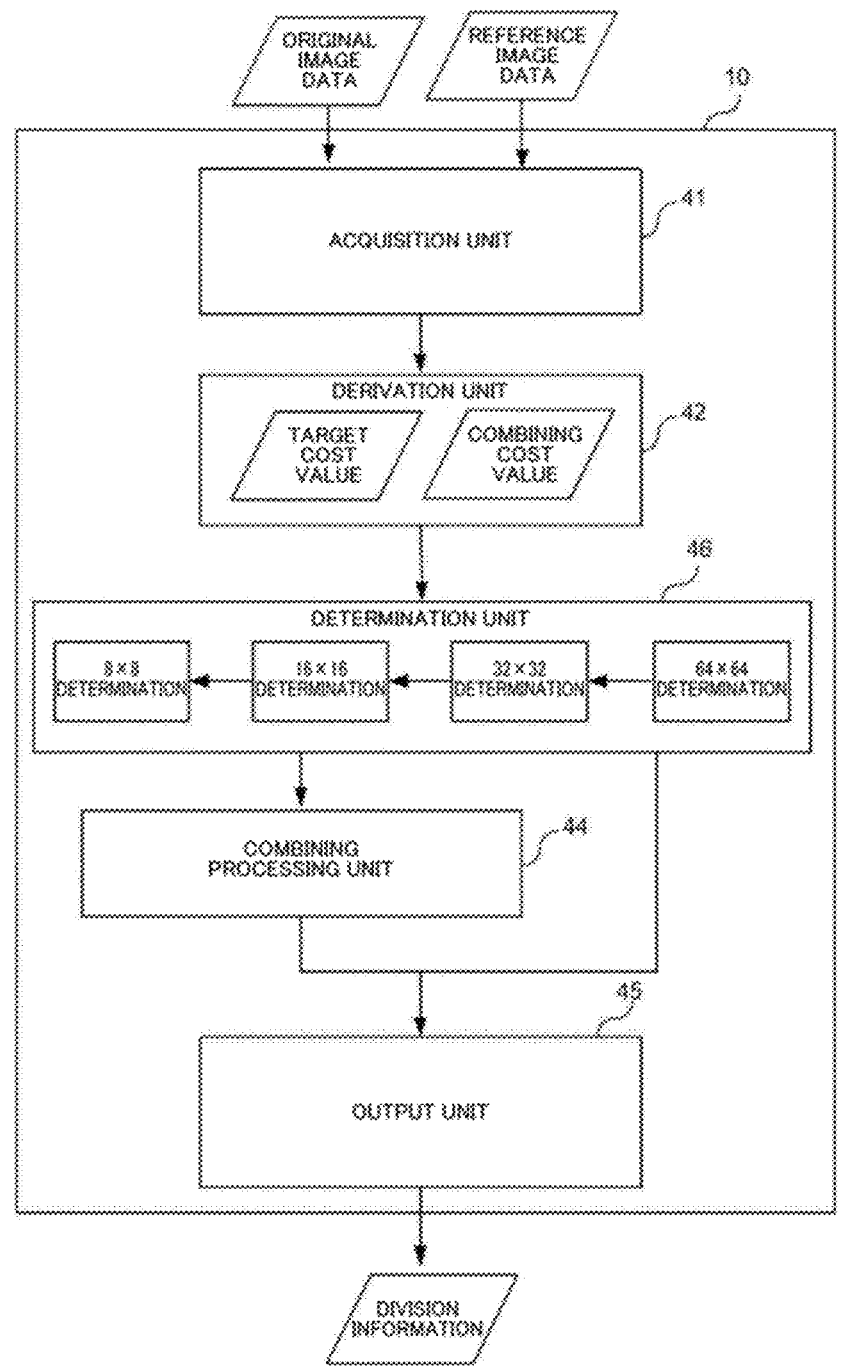
FIG. 14 is a data flow diagram showing an example of data flow of determination processing according to the second embodiment.

The functional configuration of the CU division unit 10 of the video coding device 1 will be described with reference to FIG. 13 and FIG. 14. FIG. 13 is a block diagram showing an example of a functional configuration of the CU division unit 10 of the video coding device 1. FIG. 14 is a diagram of data flow showing an example of flow of data in the dividing processing. In FIG. 13, the same functions as the functions of the CU division unit 10 shown in FIG. 6 are denoted by the same reference signs, and description thereof is omitted or simplified. In FIG. 14, the same functions as the functions of the CU division unit 10 shown in FIG. 7 are denoted by the same reference signs, and description thereof is omitted or simplified.

As shown in FIG. 13, the CU division unit 10 of a video coding device 1 includes, as a functional configuration, an acquisition unit 41, a derivation unit 42, a determination unit 46, a combining processing unit 44, and an output unit 45. The CPU 31 executes a determination processing program to function as the acquisition unit 41, the derivation unit 42, the determination unit 46, the combining processing unit 44, and an output unit 45. The combining processing unit 44 includes a division unit 44D, a prediction mode acquisition unit 44B, and a combining unit 44C. In the CU division unit 10, a determination unit 46 and a division unit 44D are different from the determination unit 43 and the division unit 44A of the first embodiment, respectively.

The determination unit 46 shown in FIG. 14 compares a combined cost value obtained by adding RD costs of the four CUs derived by the derivation unit 42 with a target cost value of the CU including the four CUs, and determines whether or not the target cost value is equal to or less than the combined cost value. As an example, the determination unit 46 compares a combined cost value of four 32×32 CUs with a target cost value of 64×64 CU including four 32×32 CUs, and determines whether or not the target cost value is equal to or less than the combined cost value.

As shown in FIG. 14, the determination unit 46 compares the combined cost values of four 32×32 CUs and the target cost values of 64×64 CU including four 32×32 CUs as 64×64 determination. Next, as 32×32 determination, the determination unit 46 compares the combined cost value of the four 16×16 CUs with the target cost value of the 32×32 CU including the four 16×16 CUs. Similarly, the determination unit 46 performs 16×16 determination and 8×8 determination. That is, the determination unit 46 recursively performs determination of comparing the target cost with the target cost, while reducing the size of the CU to be determined, from a large CU to a small CU. The determination unit 46 recursively performs determination until processing is executed to all the CUs included in the CTU. Note that, by performing the determination while reducing the size of the CU, the number of times of the determination processing is reduced and the processing amount can be reduced compared with a case where the determination is performed while reducing the size of the CU. For example, the determination unit 46 does not need to perform determination processing of the CU included in the 64×64 CU by determining the size of the target CU to 64×64 when it is determined that the target cost value in the 64×64 CU is small. In other words, since the determination unit 46 determines that the larger CU has a smaller RD cost than the divided CU, it is not necessary to divide and combine the larger CU.

The combining processing unit 44 combines blocks of the target CU when the target cost value exceeds the combined cost value, and derives the size of the combined CU, the RD cost of the CU, and a prediction mode of the CU.

Specifically, a dividing unit 44D of the combining processing unit 44 shown in FIG. 13 divides the target CU into 16 sub-blocks divided into four in the horizontal direction and in the vertical direction. When the target CU is 8×8 CU, the division unit 44D divides the target CU into 4 sub-blocks divided into two into in a horizontal direction and a vertical direction.

Figure 15:
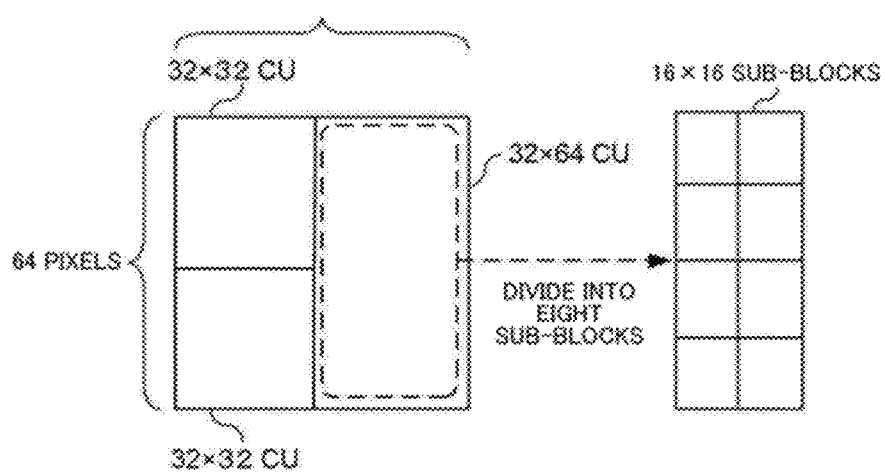
FIG. 15 is a diagram showing an example of a CU for explaining combining in a case including a rectangular CU according to a second embodiment.

When the division unit 44D is combined to a rectangular CU (for example, 32×64 CU or the like) by combining as shown in FIG. 15, the rectangular CU is divided into eight divided square sub-blocks (for example, 16×16). The square sub-blocks are combined by the prediction mode acquisition unit 44B and the combining unit 44C.

Figure 16:
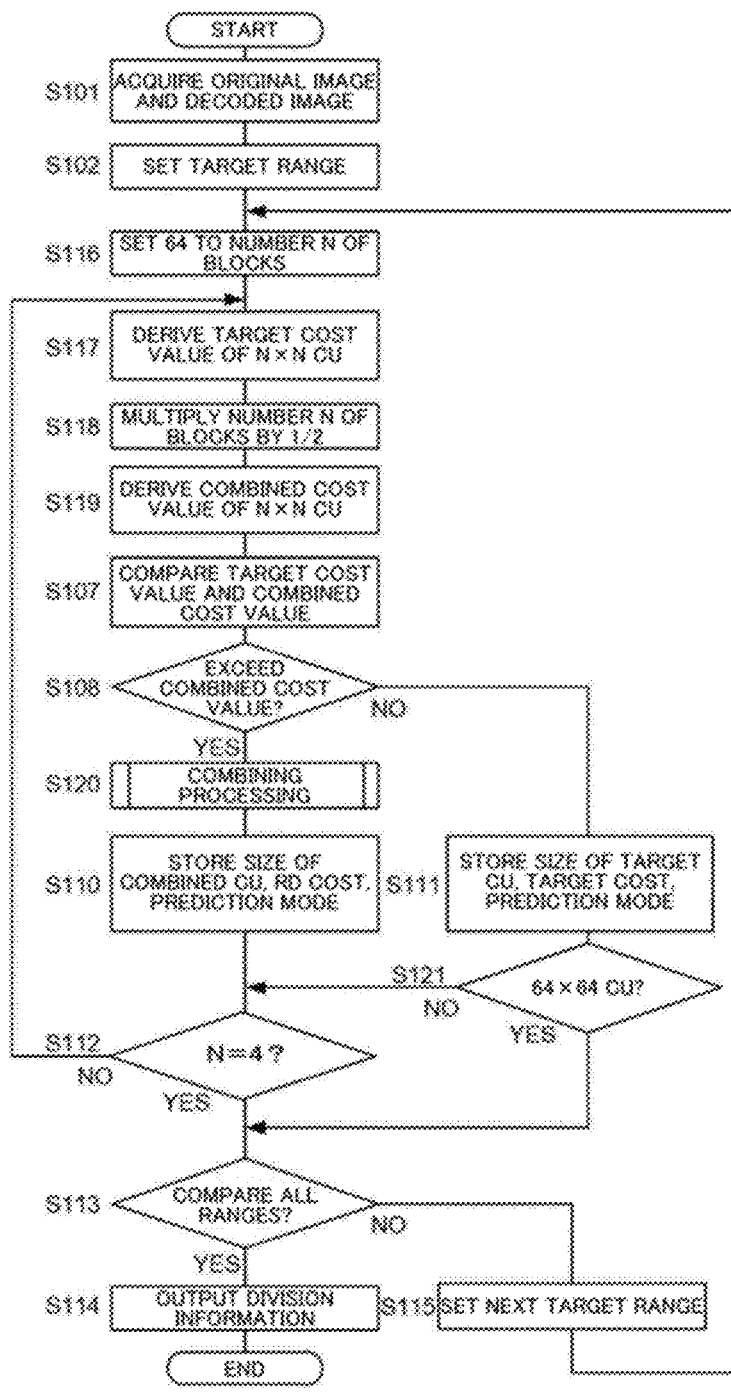
FIG. 16 is a flowchart showing an example of a flow of determination processing of determining the size of CU block according to the second embodiment.
Figure 17:
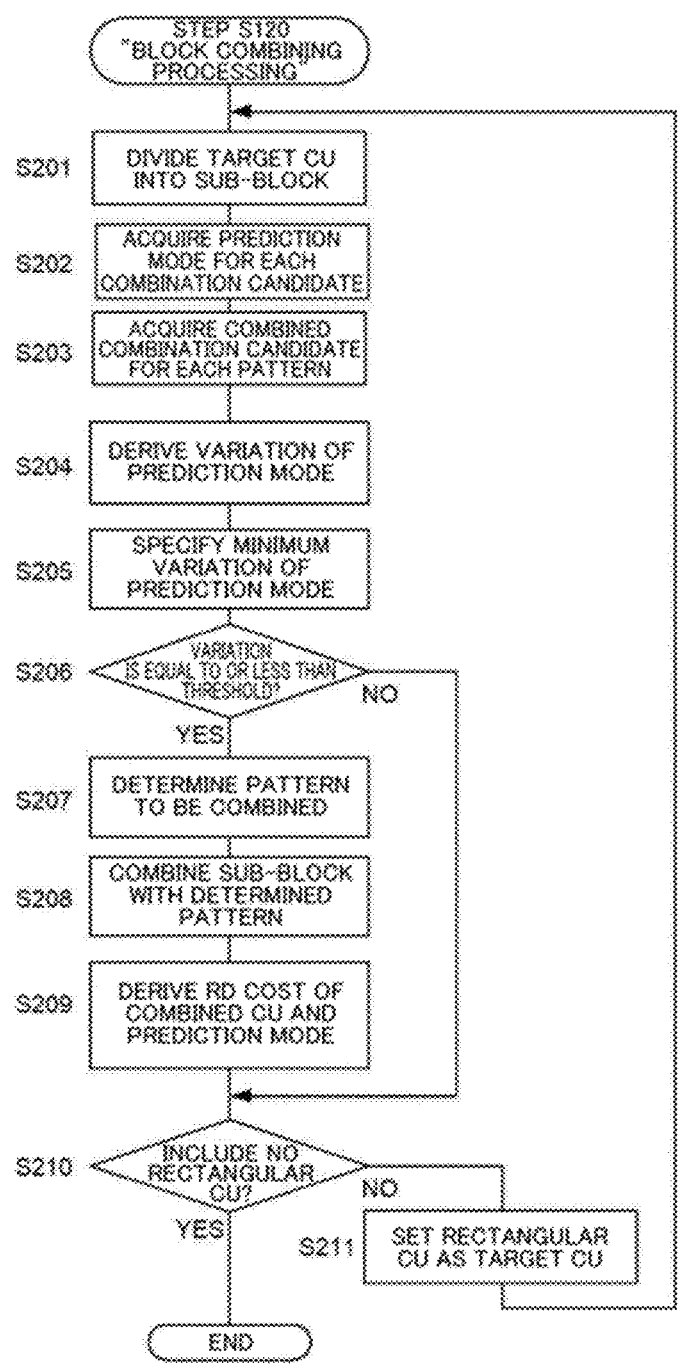
FIG. 17 is a flowchart showing an example of a flow of combining processing of combining CUs according to the second embodiment.

Next, the operation of the video coding device 1 according to the present embodiment will be described with reference to FIG. 16 and FIG. 17. FIG. 16 is a flowchart showing an example of the determination processing according to the present embodiment. The determination processing program shown in FIG. 16 is performed by the CPU 31 reading and executing the determination processing program from the ROM 32 or the storage 34. The determination processing program shown in FIG. 16 is executed when, for example, an original image is input and an instruction to execute coding is input. In FIG. 16, the same steps as steps of the determination processing in FIG. 11 are denoted by the same reference signs, and description thereof is omitted or simplified.

In a step S116, the CPU 31 sets 64 to the number N of blocks.

In a step S117, the CPU 31 derives a target cost value of N×N. Note that the target cost values of N×N according to the present embodiment are target cost values of the CU of 8×8, 16×16, 32×32, and 64×64.

In a step S118, the CPU 31 multiplies N by ½ to obtain the size of a target CU smaller by one size.

In a step S119, the CPU 31 derives a combined cost value of N×N CU. When the processing of the step S119 is performed for the first time through the step S116, the CPU 31 sets a CU of 32×32 size as a target CU. Thereafter, each time the step S117 and the step S118 are repeated, the CPU 31 reduces the size of the target CU to 16×16, 8×8, and finally 4×4.

In a step S120, the CPU 31 performs combining processing for combining the CU. The combining processing according to the present embodiment will be described later in detail with reference to FIG. 17.

In a step S121, the CPU 31 determines whether or not the target CU is 64×64 CU. When the target CU is 64×64 CU (step S121: Yes), the CPU 31 shifts to a step S113. On the other hand, when the target CU is not 64×64 CU (step S121: No), the CPU 31 shifts to a step S112.

Next, the combining processing will be described with reference to FIG. 17. FIG. 17 is a flowchart showing an example of the combining processing according to the present embodiment. The combining processing shown in FIG. 17 is performed by CPU 31 reading and executing the combining processing program from the ROM 32 or the storage 34. The combining processing program shown in FIG. 17 is executed when an instruction to execute the combining processing is input. In FIG. 17, the same steps as steps of the combining processing shown in FIG. 12 are denoted by the same reference signs, and description thereof is omitted or simplified.

In a step S210, the CPU 31 determines whether or not a rectangular CU is included among targets CU which are targets of combining processing. When the rectangular CU is not included (step S210: Yes), the CPU 31 ends the combining processing. On the other hand, when a rectangular CU is included (step S210: No), the CPU 31 shifts to a step S211.

In a step S211, the CPU 31 sets a rectangular CU as a target to be combined to the target CU, and shifts to the step S201.

As described above, the display control device of the second embodiment determines the size of the CU and combines the CU while reducing the size of the CU to be determined from the large CU to the small CU. Thus, the determination of the size of the CU and the number of execution times of the connection of the CU can be reduced.

The standard according to the present embodiment has been described in the form of VVC using QT division, BT division, TT division and the like. However, it is not limited to this. For example, in the case of a coding standard for dividing into different shapes such as QT division, BT division, and TT division, and coding is performed in divided units, any standard may be used.

Further, in the present embodiment, the processing of determining the size and combining the CU subjected to the QT division has been described. However, it is not limited to this. Processing for determining the size and combining them may be executed for the CU subjected to BT division or TT division. The CTU and CU are divided into equal CU by QT division, and the parallel processing mounted in the H. 265/HEVC coding can be easily executed.

Various processors other than the CPU may execute the display control processing executed by the CPU reading the software (program) in each of the above embodiments. Examples of processors in this case include a FPGA (Field-Programmable Gate Array) and other PLD (Programmable Logic Device) whose circuit configuration can be changed after manufacture, and an ASIC (Application-Specific Integrated Circuit) and other dedicated electric circuit that is processors with a circuit configuration designed specifically for performing a particular process. Further, the display control processing may be executed by one of these various processors, or a combination of two or more processors of the same type or different types (for example, a plurality of FPGAs or a combination of a CPU and an FPGA). Furthermore, more specifically, the hardware structure of these various processors is an electrical circuit combining circuit elements such as semiconductor elements.

Further, in each of the above embodiments, an aspect in which the display control processing is stored (installed) in the storage 34 in advance has been described, but the present invention is not limited thereto. The program may be provided in a form stored in a (non-transitory) storage medium such as a CD-ROM (Compact Disk Read Only Memory), a DVD-ROM (Digital Versatile Disk Ready Memory), and a USB (Universal Serial Bus) memory. In addition, the program may be downloaded from an external device over a network.

The following additional remarks are disclosed in relation to the embodiments described above.

(Additional Remark 1)

A display control device comprising: a memory; and at least one processor connected to the memory; wherein
the processor
is a video coding method that performs coding of an image in units of blocks into which the image is divided,
divides the image into blocks;
acquires an intra-image prediction mode predicted for each of the blocks;
determines whether or not to combine a plurality of blocks with a combination pattern based on an intra-image prediction mode of a plurality of blocks adjacent to at least any one of the blocks; and when it is determined that the plurality of blocks is combined, performs prediction for each combined block.

(Additional Remark 2)

A non-transitory storage medium having a program stored therein that can be executed by a computer to perform a video coding processing, wherein:
an image coding processing of coding an image in units of blocks into which the image is divided,
divides the image into blocks;
acquires an intra-image prediction mode predicted for each of the blocks;
determines whether or not to combine a plurality of blocks with a combination pattern based on an intra-image prediction mode of a plurality of blocks adjacent to at least any one of the blocks; and when it is determined that the plurality of blocks is combined, performs prediction for each combined block.

REFERENCE SIGNS LIST

14 Entropy coding unit
41 Acquisition unit
42 Derivation unit
43, 46 Determination unit
44 Combining processing unit
44A, 44D Division unit
44B Prediction mode acquisition unit
44C Combining unit
45 Output unit

The invention claimed is:

1. A video coding method for coding an image in units of blocks obtained by dividing the image, the method comprising a computer performing processing including:
dividing the image into blocks;
derives a target cost value that is a Rate-Distortion (RD) cost value of a target block that is a target block to be encoded, and a combined cost value obtained by dividing the target block into blocks having a predetermined size and adding a RD cost value of the divided blocks;
acquiring an intra-image prediction mode predicted for each of the blocks;
determining whether or not to combine a plurality of blocks with a combination pattern based on the intra-image prediction mode of a plurality of blocks adjacent to at least any one of the blocks;
when it is determined that the plurality of blocks is to be combined, performing prediction for each combined block;
outputs a size of the target block and the target cost value when the target cost value is equal to or less than the combined cost value;
when the target cost value exceeds the combined cost value, combines blocks of a target coding unit (CU); and
outputs a size of the combined block and a RD cost value for each of the combined blocks.

2. The video coding method according to claim 1, wherein the computer:
sets the blocks in a predetermined range as combination candidates for each combination pattern, and
determines the combination pattern of a combination candidate having a minimum degree of variation among degrees of variation in the intra-image prediction mode of the combination candidate as a combination pattern corresponding to the intra-image prediction mode.

3. The video coding method according to claim 2, wherein the computer derives the degree of variation by using a difference sum of the intra-image prediction modes between the blocks of the combined block or the variance of the intra-image prediction modes of the blocks of the combined block.

4. The video coding method according to claim 2, wherein the computer sets a range obtained by dividing the block into two or three parts in a horizontal direction or a vertical direction.

5. The video coding method according to claim 1, wherein the computer recursively executes comparison of the target cost value and the combined cost value, and combining of the blocks included in the target block for each predetermined size of the target block.

6. A video coding device that codes an image in units of blocks obtained by dividing the image, the video coding device comprising:
   a memory; and
   at least one processor coupled to the memory, the at least one processor being configured to:
   divide image into blocks;
   derives a target cost value that is a Rate-Distortion (RD) cost value of a target block that is a target block to be encoded, and a combined cost value obtained by dividing the target block into blocks having a predetermined size and adding a RD cost value of the divided blocks;
   acquire an intra-image prediction mode predicted for each of the blocks;
   determine whether to combine a plurality of blocks with a combination pattern based on the intra-image prediction mode of a plurality of blocks adjacent to at least any one of the blocks;
   outputs a size of the target block and the target cost value when the target cost value is equal to or less than the combined cost value;
   when the target cost value exceeds the combined cost value, combines blocks of a target coding unit (CU); and
   outputs a size of the combined block and a RD cost value for each of the combined blocks.

7. A non-transitory storage medium storing a video coding program for coding an image in units of blocks obtained by dividing the image, the program being executable by a computer to perform processing comprising:
   dividing the image into blocks;
   derives a target cost value that is a Rate-Distortion (RD) cost value of a target block that is a target block to be encoded, and a combined cost value obtained by dividing the target block into blocks having a predetermined size and adding a RD cost value of the divided blocks;
   acquiring an intra-image prediction mode predicted for each of the blocks;
   determining whether or not to combine a plurality of blocks with a combination pattern based on the intra-image prediction mode of a plurality of blocks adjacent to at least any one of the blocks;
   when it is determined that the plurality of blocks is to be combined, performing prediction for each combined block;
   outputs a size of the target block and the target cost value when the target cost value is equal to or less than the combined cost value;
   when the target cost value exceeds the combined cost value, combines blocks of a target coding unit (CU); and
   outputs a size of the combined block and a RD cost value for each of the combined blocks.

* * * * *